Nov. 6, 1928.
J. W. WELSH
1,690,604
SPECTACLE TEMPLE
Filed Dec. 29, 1923

Inventor:—
James W. Welsh
by David Rines
Attorney:—

Patented Nov. 6, 1928.

1,690,604

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE.

Application filed December 29, 1923. Serial No. 683,437.

The present invention relates to spectacle temples, and more particularly to flexible or cable temples comprising non-metallic material, like zylonite.

In some types of cable temples of the above-described character, the ear hook comprises a non-metallic tube cut into the form of a helix. In other types, the non-metallic material is constituted of one or more non-metallic strands wound into helical form. In both types, the non-metallic material is mounted over a metal reinforcing rod.

The object of the present invention is to provide an improved spectacle temple of the above-described character, and with this end in view, the invention consists of the improved spectacle temple hereinafter described, illustrated in the accompanying drawings and defined in the appended claims.

Figure 1:
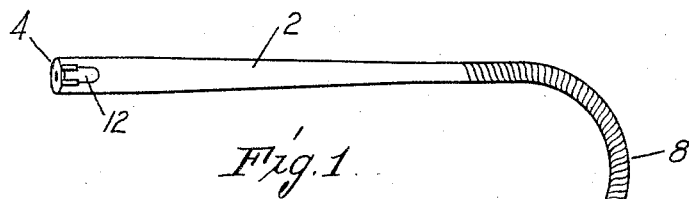
Figure 3:
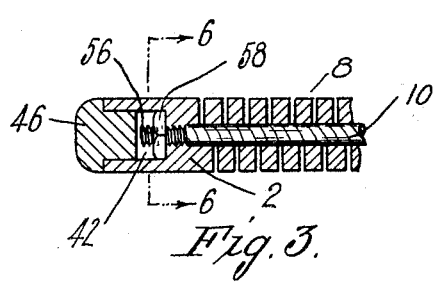
Figure 2:
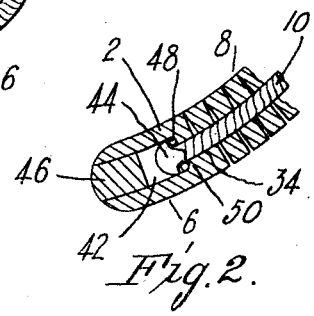
Figure 6:
Figure 4:
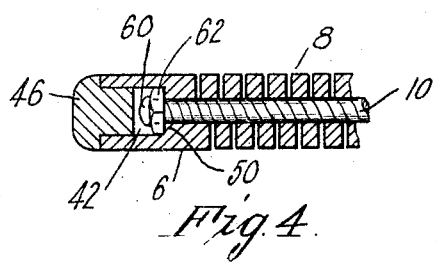
Figure 7:
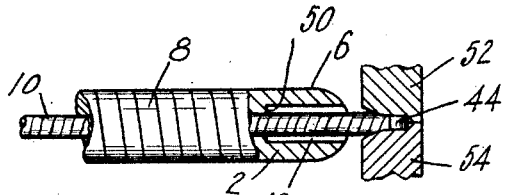
Figure 5:
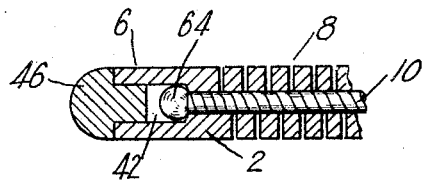
Figure 9:
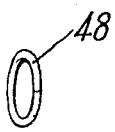
Figure 8:
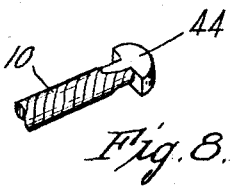
Figure 10:
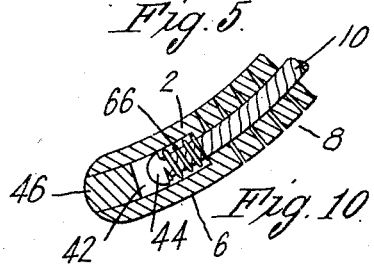

In the accompanying drawings, Fig. 1 is an elevation of a spectacle temple constructed according to a preferred embodiment of the present invention; Fig. 2 is a longitudinal section of a fragment of the same; Figs. 3, 4 and 5 are similar sections of modifications; Fig. 6 is a section taken upon the line 6—6 of Fig. 3, looking in the direction of the arrows; Fig. 7 is a fragmentary elevation, partly in section, illustrating a step in the manufacture of the preferred temple shown in Figs. 1 and 2; Figs. 8 and 9 are perspective detail views of parts of the preferred temple; and Fig. 10 is a view of a further modification.

For the purpose of illustrating the invention, a preferred temple is shown comprising a non-metallic tube 2 the forward portion 4 of which is provided with a hinge member 12, whereby the temple may be hinged to a spectacle frame. The rear portion of the tube 2 is curved into the form of an ear hook, and is cut into the form of a helix, as shown at 8, to render the ear hook flexible. A reinforcing rod or wire 10 is mounted in the bore 34 of the tube. The reinforcing rod 10 is itself illustrated as of the cable type such as is used for ordinary metal spectacle temples, but the invention is not restricted to any particular type of reinforcing rod. The rear end or tip 6 of the helically cut tube is left uncut, but is provided with a counterbored recess 42 of larger diameter than the bore 34 of the tube. The rod 10 is provided with a flattened terminal enlargement 44 that is seated in the recess 42. Owing to the resilient nature of the non-metallic material, the parts of the helical element 8 can be very snugly pulled together by this construction. A washer 48, shown as a split ring, is mounted on the reinforcing rod 10 and seated in the counterbored recess 42 between the enlargement 44 and the end wall 50 of the recess 42 to prevent the flattened enlargement 44 biting into, and thereby weakening, the non-metallic material. The opening in the end wall 50 is a continuation of the bore 34 and is naturally of smaller diameter than the diameter of the enlarged portion of the recess. The end of the rod 10 extends through the end wall 50 and washer and the enlargement 44 engages the washer to lock the tube 2 on the rod 10. A plug 46 is mounted in the recess 42 to conceal the enlargement 44.

The flattened enlargement 44 would render it somewhat difficult to mount the reinforcing rod 10 in the bore 34 of the tube 2, particularly if the hinge member 12 is integral with, or soldered to, the reinforcing rod. It is therefore preferred to flatten the end of the reinforcing rod after the rod has previously been mounted in the bore 34. This may be effected by means of dies 52 and 54, or in any other desired or preferred way, after the coil 8 has first been compressed longitudinally of the rod 10, as illustrated in Fig. 7. Prior to the action of the dies, the end of the rod 10 is first upset, very much as is illustrated in Fig. 5, so as to obtain a larger terminal 44. The coil 8 is then allowed to resume its normal shape, thereby bringing the enlargement 44 into the recess 42, the tube and the rod becoming thus secured together in assembled relation. In some cases, and if the enlargement 44 is properly shaped, the enlargement 44 may form its own recess 42 when the coil 8 is released to resume its normal shape.

According to the modification of Fig. 3, the terminal of the reinforcing rod is threaded at 56, and a nut 58 is threaded thereover to the required degree of tightness. Or, the end of the reinforcing rod may be provided with a small knob 60, and a washer 62 may be interposed between the knob 60 and the wall 50 of the recess 42, as shown in Fig. 4. In the construction of Fig. 4, the rod 10 must be mounted in the bore 34 before the hinge plate 12 has been attached thereto. In the modification shown in Fig. 5, the rod 10 is simply provided with an enlarged terminal ball head 64 that is seated in the recess 42. The mounting of the ball head 64 is a matter that will present no difficulties to persons skilled in the art. A coil spring 66 may replace the washer 48 of Figs. 2, 4 and 9, but it should not be so strong as to cause the ear hook 8 to straighten out.

According to the preferred method of manufacture, the ear hook 8 is not shaped until after the parts have been assembled as before described, but further description is unnecessary, because having no particular bearing upon the features of novelty constituting the present invention.

It will be understood that the invention is not restricted to the exact embodiments thereof that are illustrated and described herein, but that many other modifications will readily occur to persons skilled in the art, and all such are considered to fall within the spirit and scope of the invention, as defined in the appended claims.

What is claimed is:

1. A spectacle temple comprising an element in the form of a helix, a terminal member provided with a counterbored recess having an end wall provided with an opening communicating with the bore of the helix, the opening in the end wall being smaller in cross dimension than the enlarged portion of the counterbored recess, and a rod in the helix having an enlarged element seated in the enlarged portion of the counterbored recess.

2. A spectacle temple comprising a tube constituted of resilient, non-metal material, a portion of the tube being cut into the form of a helix and an end portion of the tube being provided with an enlarged recess, and a rod in the helix having an enlarged terminal element seated in the recess, the recess being provided with a plug to conceal the enlarged element.

3. A spectacle temple comprising an element in the form of a helix, a terminal member having an enlarged recess communicating with the bore of the helix, and a rod in the helix the terminal portion of which is enlarged, the enlarged portion of the rod being seated in the recess.

4. A spectacle temple as defined in claim 3 in which a washer is mounted upon the rod between the enlargement and the end wall of the recess.

5. A spectacle temple as defined in claim 3 in which the enlarged portion is flattened.

6. A spectacle temple as defined in claim 3 in which a split ring is mounted upon the rod between the enlargement and the end wall of the recess.

7. A spectacle temple formed of a wire covered with a non-metallic tube, the end of the tube being counterbored, a washer seated in the counterbore and the end of the wire extending through the washer and having an enlargement engaging the washer to lock the tube on the wire.

8. A spectacle temple formed of a wire covered with a non-metallic tube, the ear-engaging portion of the tube being in helical form, the end of the tube being counterbored, a washer seated in the counterbore, and the end of the wire extending through the washer and having an enlargement engaging the washer to lock the helical portions of the tube in compressed position.

9. A spectacle temple comprising an element in the form of a helix and having integral therewith an end portion provided with an enlarged recess communicating with the bore of the helix, and a rod in the helix having an enlarged element seated in the recess.

10. A spectacle temple comprising non-metallic material adapted to be hinged at the forward end, the rear portion of the non-metallic material being flexible compared to the forward portion and having an end portion provided with an enlarged recess having an end wall provided with an opening, and a flexible metal rod in the rear portion and extending through the opening and having an enlarged terminal element seated in the recess.

In testimony whereof, I have hereunto subscribed my name this 27th day of December, 1923.

JAMES W. WELSH.